United States Patent [19]

Thomas

[11] 3,761,500
[45] Sept. 25, 1973

[54] LIQUID DOUBLE ALKOXIDES
[75] Inventor: Ian M. Thomas, Temperance, Mich.
[73] Assignee: Owens-Illinois, Inc., Toledo, Ohio
[22] Filed: Mar. 31, 1972
[21] Appl. No.: 240,232

Related U.S. Application Data
[63] Continuation-in-part of Ser. No. 40,702, May 26, 1970, abandoned.

[52] U.S. Cl. .......................................... 260/448 AD
[51] Int. Cl. .............................................. C07f 5/06
[58] Field of Search ............................. 260/448 AD

[56] References Cited
UNITED STATES PATENTS
1,689,356  10/1928  Meerwein ................. 260/448 AD
2,687,423  8/1954  Mesiron .................... 260/448 AD

FOREIGN PATENTS OR APPLICATIONS
889,125  2/1962  Great Britain ............. 260/448 AD

OTHER PUBLICATIONS
Chemical Abstracts, Vol. 37, 5019, 5020 (1943).
Chemical Abstracts, Vol. 56, 14472h (1962).
Chem. Ber. Vol. 85, pg. 272 (1952).
Chemical Abstracts, Vol. 24, 586, 587 (1930).

*Primary Examiner*—Helen M. S. Sneed
*Attorney*—Robert F. Rywalski et al.

[57] ABSTRACT

Double alkoxides of the type represented by the formula $MgAl_2(OR)_8$, or alternatively represented by the formula $Mg[Al(OR)_4]_2$, wherein the OR group designates a secondary alkoxy group containing 4 to 7 carbon atoms, are provided. These alkoxides are liquids at 25° C. and one atmosphere of pressure. Particularly preferred alkoxides are the magnesium aluminum double alkoxides of the type represented by the formula $Mg[Al(OR)_4]_2$, wherein R is

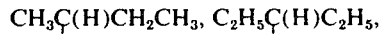
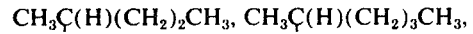
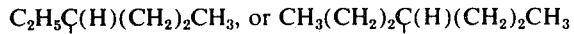

7 Claims, No Drawings

LIQUID DOUBLE ALKOXIDES

CROSS-REFERENCES

This application is a continuation-in-part of copending application, Ser. No. 40,702, filled May 26, 1970 now abandoned, and assigned to the same assignee.

THE INVENTION

This invention, in general, relates to metal alkoxides, especially double alkoxides; more particularly, this invention relates to the production of double alkoxides alternatively represented by the formulas $Mg[Al(OR)_4]_2$ and $MgAl_2(OR)_8$ wherein the R group represents a monovalent secondary alkyl radical of 4 to 7 carbon atoms, for example, sec. butyl, sec. pentyl, sec. hexyl, sec. heptyl.

As contemplated herein, a reactable mixture is prepared which includes elemental magnesium, an aliphatic alcohol and an aluminum alkoxide of the same aliphatic alcohol; the mixture is then heated to a sufficient temperature and for a sufficient time to allow the reaction to take place, which results in the formation of a compound represented by the formula $Mg[Al(OR)_4]_2$ or, alternatively by the formula $MgAl_2(OR)_8$, hereinafter termed a double alkoxide, wherein the OR group is a secondary alkoxide group. R is a secondary alkyl having between 4 and 7 carbon atoms, such as, for example, sec. butyl, a 2 or 3 pentyl, a 2 or 3 hexyl, a 2, 3 or 4 heptyl. Because of the tendency for hydrolysis, the reaction will advantageously be carried out in a dry atmosphere, such as, for example, under a nitrogen blanket or a dry air blanket. The desired double alkoxide reaction product is then recovered from the reaction system, for example, by vaporization, distillation, evaporation and the like.

Hereinafter aluminum alkoxides will, for purposes of convenience, be set forth and represented by the formula $Al(OR)_3$ wherein the OR group is an alkoxy group of 4 to 7 carbon atoms. Those skilled in the art, however, will appreciate that the actual structural representation for aluminum alkoxides is most likely more appropriately represented in polymeric form by the formula $[Al(OR)_3]_x$ wherein x is an integer of 2 or more.

While applicant does not wish to be bound by theoretical considerations, the reaction of the respective reactants may be thought of as proceeding along the lines of the equation set forth below:

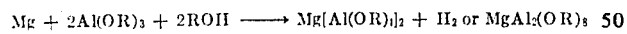

$Mg + 2Al(OR)_3 + 2ROH \longrightarrow Mg[Al(OR)_4]_2 + H_2$ or $MgAl_2(OR)_8$

In the above equation, it will be noted that the reaction generally proceeds by the reaction of about two equivalents of the aluminum alkoxide per equivalent of Mg and with the reaction of about two equivalents of alcohol per equivalent of Mg, to produce the double alkoxide product along with the liberation of hydrogen gas. The R group of the OR group of the aluminum alkoxide represents a secondary $C_4$ to $C_-$ alkyl group and the R group of the alcohol, ROH, is the same as the R group of the aluminum alkoxide.

The foregoing reaction is easily and conveniently carried out with no difficulties in reaction rate control being encountered. It will also be observed that no catalyst is required for this reaction. That is, no external catalyst need be added, such as, for example, iodine or mercury compounds, which will serve to contaminate the final product. Typical yields will be in the ninety percent range.

As hereinbefore indicated, the present invention provides for magnesium aluminum alkoxides of the formula $MgAl_2(OR)_8$ wherein the R group is a secondary alkyl group of 4 to 7 carbon atoms. These compositions quite surprisingly are liquids at 25° C. and one atmosphere of pressure which, upon standing for weeks, months, and for probably an indefinite period of time, are stable, and no solidification will take place. Those skilled in the art will readily appreciate the importance of this liquid feature of the invention, inasmuch as it is well known in chemical processing that it is much more convenient and economical to employ liquids as opposed to solids. This is especially true with regard to these types of compounds which are easily hydrolyzed and thus, by allowing for the more convenient use of the material, one can more easily preclude and substantially eliminate any possibilities of premature hydrolysis taking place by, for example, contact with a humid environment, such as moist air. Another feature of the liquids which makes them quite desirable is that they may be purified at a later time quite easily by conventional distillation techniques. Exemplary R (secondary alkyl) groups include secondary butyl, a 2 or 3 pentyl, a 2 or 3 hexyl, or a 2, 3 or 4 heptyl group. Especially highly preferred R groups include the following:

$CH_3\underset{|}{C}(H)CH_2CH_3$, $C_2H_5\underset{|}{C}(H)C_2H_5$

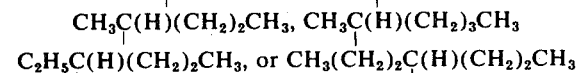

$CH_3\underset{|}{C}(H)(CH_2)_2CH_3$, $CH_3\underset{|}{C}(H)(CH_2)_3CH_3$ $C_2H_5\underset{|}{C}(H)(CH_2)_2CH_3$, or $CH_3(CH_2)_2\underset{|}{C}(H)(CH_2)_2CH_3$ The double alkoxides, as contemplated in this invention, are especially useful in the formation of ultra high purity magnesium-aluminum oxide compositions corresponding to the spinel formula $MgO \cdot Al_2O_3$. This may be done, for example, by hydrolyzing the double alkoxide with an effective hydrolyzing amount of water, say 6 to 8 moles of water per mole of double alkoxide, and then calcining, or firing, the hydrolysis product to the oxidic product of magnesium and aluminum. The double alkoxide represented by the formula $Mg[Al(OR)_4]_2$ wherein the OR group is a secondary alkoxy group are most desirable for this latter purpose, inasmuch as these double alkoxides are stable liquids at 25° C. and one atmosphere pressure which may, therefore, be easily purified by distillation, thereby greatly enhancing the ultimate purity of the spinel-type composition.

While, as indicated above, the reaction is generally thought to proceed along the lines of about two equivalents of the aluminum alkoxide, about two equivalents of the aliphatic alcohol, and about one equivalent of magnesium, it is extremely desirable that the charge of the respective reactants be somewhat modified. That is, it is desirable to use a slight excess of magnesium, say on the order of approximately 0.5 percent to about 2 to 3 mole percent or higher, to ensure that there is no free aluminum alkoxide remaining. If free aluminum alkoxide is present, it typically will be separated from the reaction system along with the desired double alkoxide and serve to undesirably contaminate the product. Similarly, it is preferred to use approximately 5 mole percent to 50 mole percent, or higher, excess alcohol, the excess being employed as a solvent and diluent. Expressed on the basis of a charge of about two equivalents of aluminum alkoxide, the charge of elemental magnesium or calcium will preferably be about 1.002 to about 1.05 equivalents or more and most desirably about 1.005 to about 1.02 or 1.03 equivalents, and the charge of the alkyl alcohol will preferably be about at least 2.1 equivalents to about 2.75 equivalents or more and most desirably about 2.1 to about 2.5 or 2.6 equivalents. Alternatively, on the basis of about 1 equivalent of Mg, the charge of aluminum alkoxide will preferably be about 1.90 to about 1.995 equivalents and the charge of alkyl alcohol about 2 to about 2.74 equivalents.

As indicated above, it is generally preferred to use an excess of the alkyl alcohol, whereby this excess serves to function as a solvent or diluent. If desired, however, the reaction mixture may also include an inert solvent or diluent. In order to allow for convenient separation of the final desired product, these solvents or diluents, in general, advantageously will not have volatility characteristics which are substantially the same as those of the final product. For convenience, solvents having boiling points of between about 80°C. and about 170°C. or so are preferred. Materials which are advantageously used are the hydrocarbons including the straight branched or cyclic alkanes having about 4, 5 or 6 carbon atoms to about 20 or 30 carbon atoms, and especially the n-alkanes having about 6 to 13 carbon atoms, e.g., ethylcyclohexane, n-hexane, 1-methyl-3-ethylcyclo-pentane, cycloheptane, n-heptane, octanes, nonanes, n-hexadecane, aromatics and alkyl substituted aromatics like

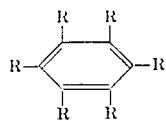

wherein each R is independently H or a $C_1$–$C_{30}$ alkyl group and preferably H or a $C_1$–$C_7$ alkyl group, e. g., benzene, toluene, xylene and the like, biphenyl, petroleum naptha, petroleum spirits, mineral spirits, kerosene and the like. Naphthalene and alkyl substituted naphthalenes of the formula

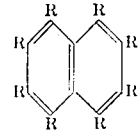

anthracene and alkyl substituted anthracenes of the formula

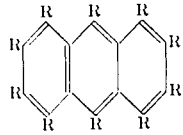

wherein R is independently H or a $C_1$–$C_{30}$ alkyl, preferably H or a $C_1$ – $C_7$ alkyl, like methyl, isopropyl, or n-hexyl may also be used. Of course, when materials are used which are solid at room temperature, it will be necessary to first melt these diluents in which case the desired reaction will be done at a temperature in excess of the melting points of the diluents.

After the aluminum alkoxide, aliphatic alcohol and magnesium are charged to the reactor in any convenient order, the materials are reacted. If the aluminum alkoxide employed is a solid, this alkoxide may be dissolved in the alcohol employed or in a diluent or solvent of the type described above. Inasmuch as the reaction rate is dependent on the temperatures, reactant concentrations and the like, the conditions of the time and temperature for the reaction will, of course, vary. Additionally, the rate of the reaction increases with lower alcohols. In general, however, the reactants may be reacted at temperatures between about room temperature and about 300° C. or higher, but at a temperature insufficient to thermally decompose the double alkoxide. At the lower temperatures, times on the order of a week or more may be required to obtain high yields.

According to the preferred practice of this invention, a liquid aluminum alkoxide is employed and the mixture including this alkoxide, elemental magnesium and the alcohol is reacted by heating to about the reflux temperature of the mixture. The time for the reaction may be varied and may be short as about one-fourth of an hour, although for good yields, a time in excess of about two or three hours is preferred. Most desirably, the system will be reacted for at least about ten and preferably at least about sixteen hours.

After the reaction is essentially complete, for example, as monitored by a cessation of hydrogen evolution, the desired substantially pure product of the formula $MgAl_2(OR)_8$ is separated and recovered as a stable liquid. For example, the reacted system is first volatilized to remove excess diluent at a pressure of 50 mm of Hg or less, preferably about 1 mm of Hg, and the double alkoxide is then recovered by volatilization at a pressure of about 50 mm of Hg or less, preferably less than about 10 mm and most desirably at a pressure of about 0.1 mm Hg. Generally, it is preferred to volatilize the double alkoxide at as low a temperature as possible, to preclude thermal degradation. Temperatures less than about 175° C., for example, about 130° C. to about 160° C., may be employed for this purpose.

While the invention has been described above with sufficient particularity to enable others to make and use the invention, there follows an example setting forth a preferred mode of making and using the invention. It is, of course, understood that the example is merely exemplary and is not to be construed as limiting.

EXAMPLE 1

At room temperature, there was charged into a flask about 20 gram moles of liquid aluminum secondary butoxide [calculated as the monomer $Al(OR)_3$], about 25 moles of secondary butanol, and about 10.1 gram-atoms of magnesium turnings (about 2 equivalents of alkoxide, about 2.5 equivalents of butanol and about 1.01 equivalents of Mg). The mixture, with stirring, was then heated to the reflux temperature, about 99° C., and held at that temperature with a noticeable evolution of hydrogen gas from the reaction mixture. After approximately 20 hours, the hydrogen liberation substantially ceased and the temperature had increased to approximately 115° C. The reacted mixture was then distilled at about 1 millimeter of mercury of pressure and at a temperature of about 80°–100° C. to effect the removal of the excess secondary butanol from the mixture. The residue, after this distillation, was then further distilled at a temperature of approximately 140° to 150°C. at a pressure of approximately 0.1 mm of mercury and a clear, colorless liquid distillate was obtained. Based on the charge of aluminum secondary butoxide to the system, a yield of 95 percent of the clear, colorless liquid was obtained corresponding to the formula $MgAl_2(sec-OC_4H_9)_8$.

1.000 gram of the clear, colorless liquid as produced above was then hydrolyzed with about 2 ml of water in a platinum crucible, and then slowly heated to a temperature of about 800°C. and held at that temperature for a time sufficient to remove all combined and uncombined water to thereby produce a calcined oxide product. When analyzed, 0.216 gram of a composition corresponding to the formula $MgO \cdot Al_2O_3$ or $MgAl_2O_4$ was obtained from the hydrolysis of the colorless liquid alkoxide. In contrast, the theoretical amount of a product corresponding to the formula $MgO \cdot Al_2O_3$ or $MgAl_2O_4$ is 21.5 percent based on a compound of the formula $MgAl_2(sec-OC_4H_9)_8$.

The oxide product, when subjected to an emission spectrographic analysis, showed the following impurities in parts by weight:

| | |
|---|---|
| Silicon | 72 ppm |
| Mn | 17 ppm |
| Fe | 6 ppm |
| Ag | 3 ppm |
| B | 3 ppm |
| Cu | 5–20 ppm |
| Total Alkali Metal | 2 ppm |
| No Other Metals Being Detected | |

The double alkoxides of this invention are of utility as refractory materials when decomposed to the oxides.

While the foregoing describes the manner of making and using the present invention, it will, of course, be understood that modifications may be made. Accordingly, the true scope of the present invention is as defined in the following claims.

I claim:

1. As a composition of matter, a double alkoxide which is a liquid at 25° C. and 1 atmosphere of pressure, said alkoxide corresponding to the formula $MgAl(OR)_8$ wherein R is a monovalent alkyl radical selected from the group consisting of

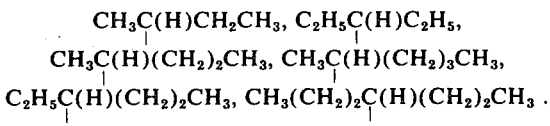

2. The composition of claim 1 wherein R is

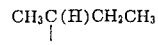

3. The composition of claim 1 wherein R is

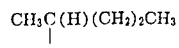

4. The composition of claim 1 wherein R is

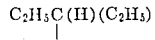

5. The composition of claim 1 wherein R is a radical of the formula

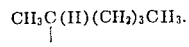

6. The composition of claim 1 wherein R is a radical of the formula

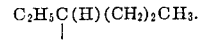

7. The composition of claim 1 wherein R is a radical of the formula

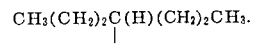

* * * * *